(12) United States Patent
Hunwardsen

(10) Patent No.: US 7,108,273 B2
(45) Date of Patent: Sep. 19, 2006

(54) MOTORCYCLE FOOTREST

(76) Inventor: Lyle Hunwardsen, 4531 Franklin Blvd., Space 102, Eugene, OR (US) 97403

(*) Notice: Subject to any disclaimer, the term of this patent is extended or adjusted under 35 U.S.C. 154(b) by 77 days.

(21) Appl. No.: 10/985,430

(22) Filed: Nov. 10, 2004

(65) Prior Publication Data

US 2006/0103108 A1    May 18, 2006

(51) Int. Cl.
*B62J 25/00*     (2006.01)
*B62J 27/00*     (2006.01)
(52) U.S. Cl. .............. 280/291; 280/304.3; 180/219
(58) Field of Classification Search ............. 280/304.3, 280/291; 180/219
See application file for complete search history.

(56) References Cited

U.S. PATENT DOCUMENTS

| | | | |
|---|---|---|---|
| 6,419,039 B1 * | 7/2002 | Wagner | 180/219 |
| 6,758,484 B1 * | 7/2004 | Rice | 280/304.4 |
| 6,969,083 B1 * | 11/2005 | Egan | 280/291 |
| 6,981,713 B1 * | 1/2006 | Lindby | 280/291 |

* cited by examiner

*Primary Examiner*—Lesley D. Morris
*Assistant Examiner*—Marc A. Scharich
(74) *Attorney, Agent, or Firm*—Klein, DeNatale, Goldner; James M. Duncan

(57) ABSTRACT

A motorcycle footrest used in combination with a motorcycle crash bar has a body member and a step member pivotally attached to the body member. The body member is disposed between adjacent portions of the crash bar. The footrest folds into the crash bar to provide a stream lined and custom appearance.

19 Claims, 8 Drawing Sheets

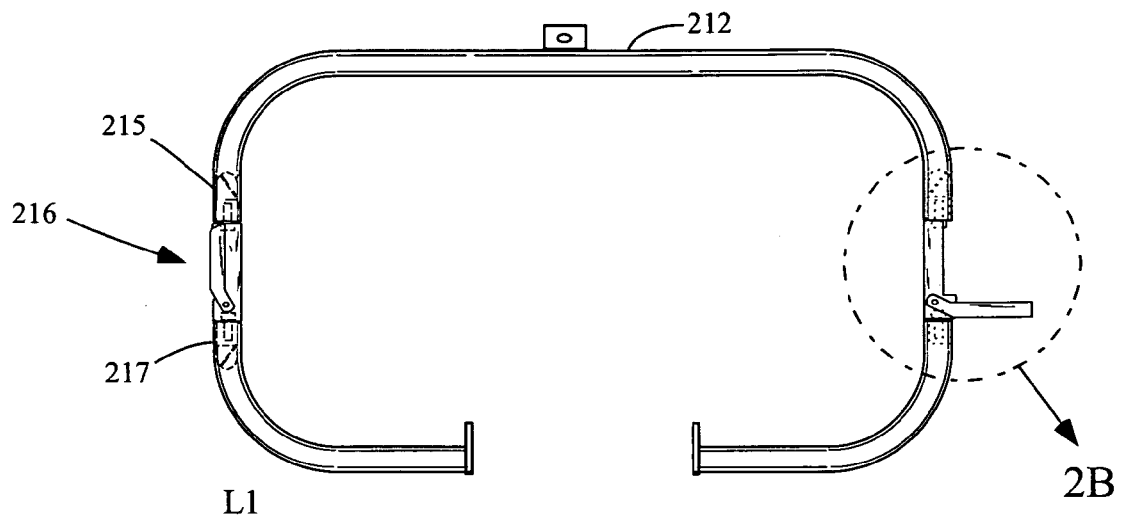
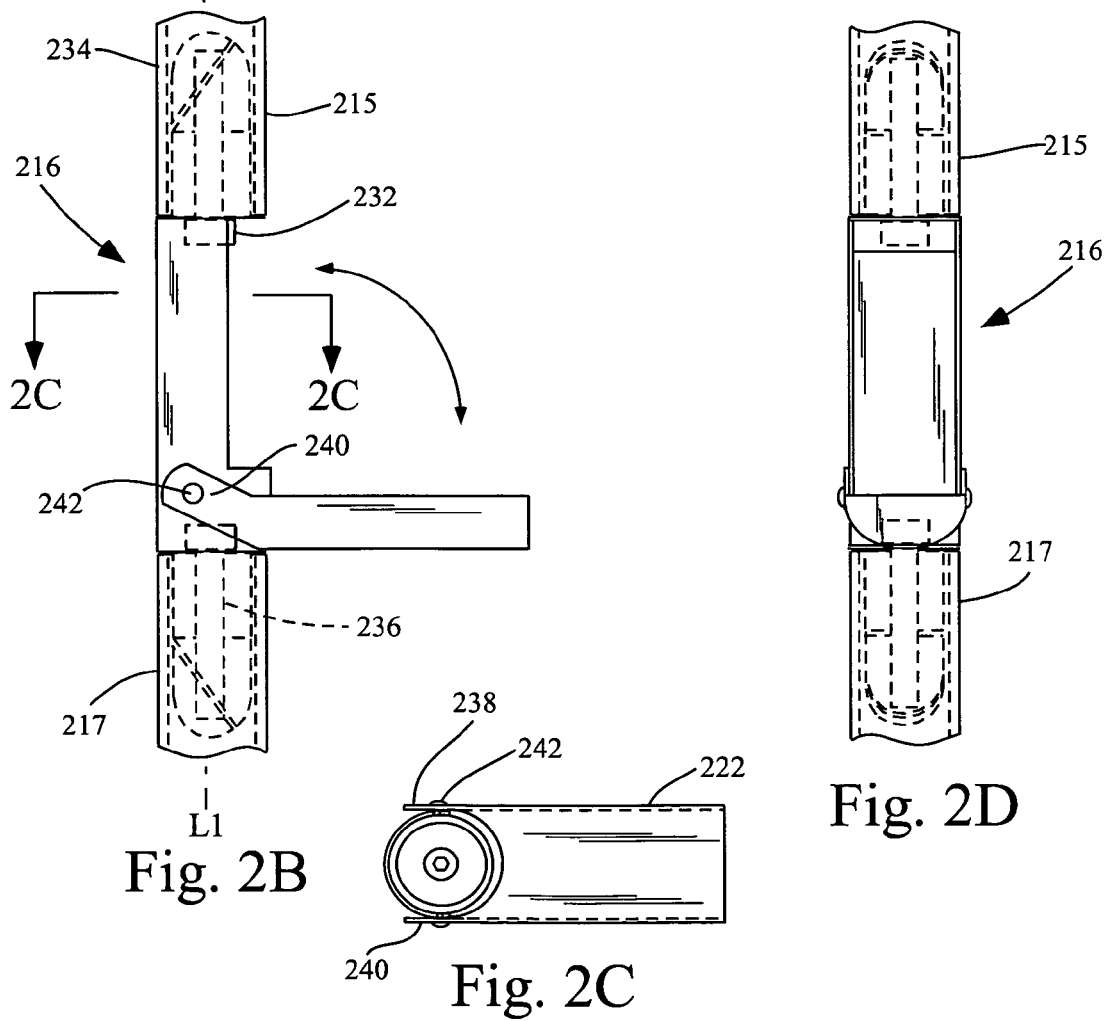

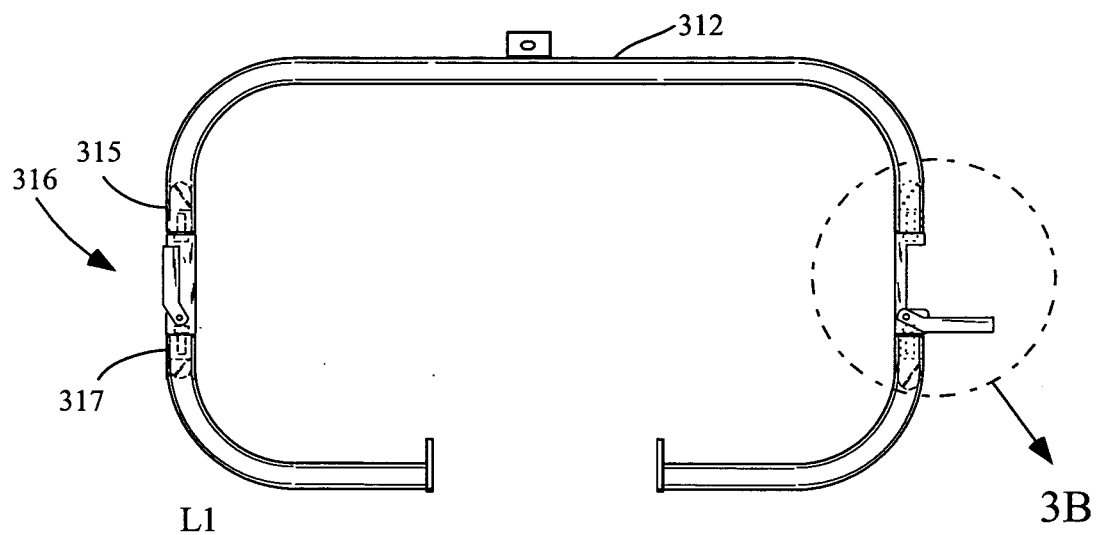
Fig. 3A
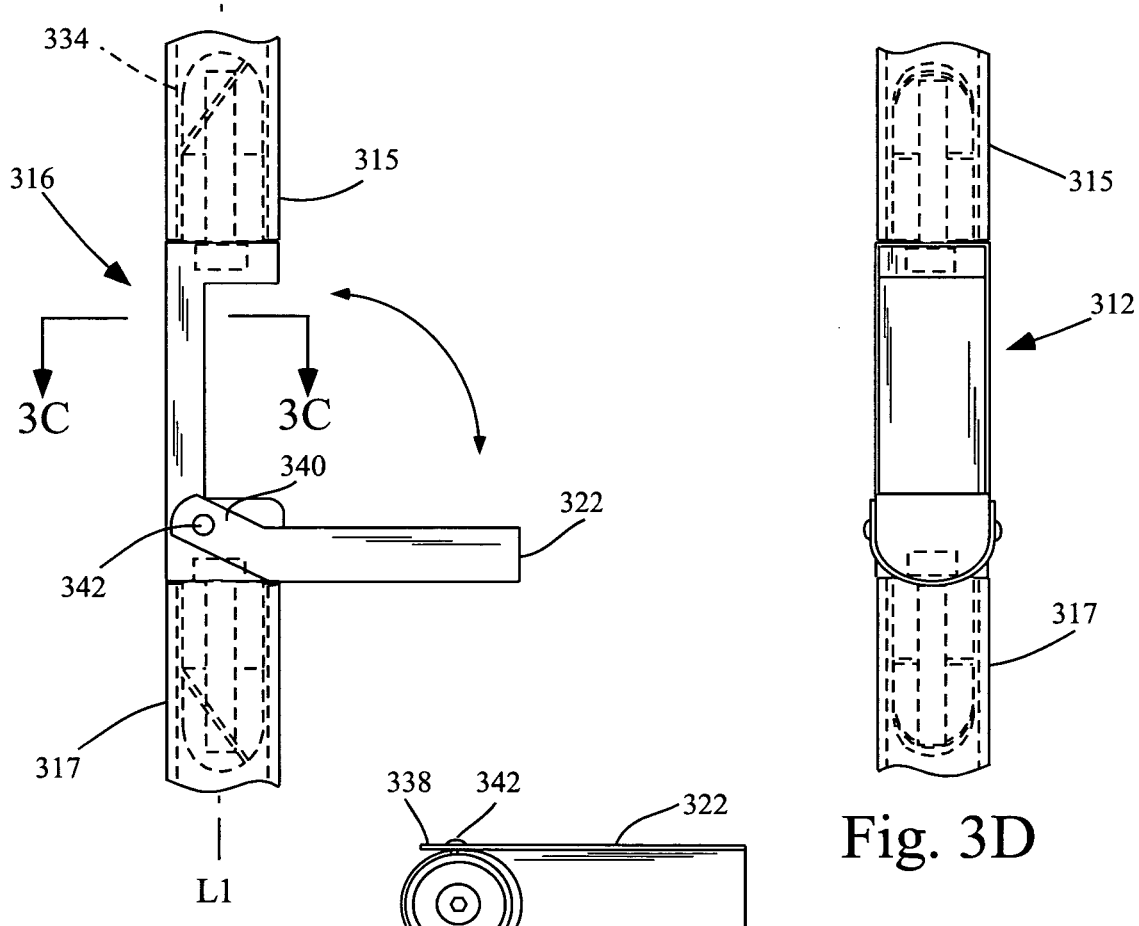
Fig. 3B
Fig. 3C
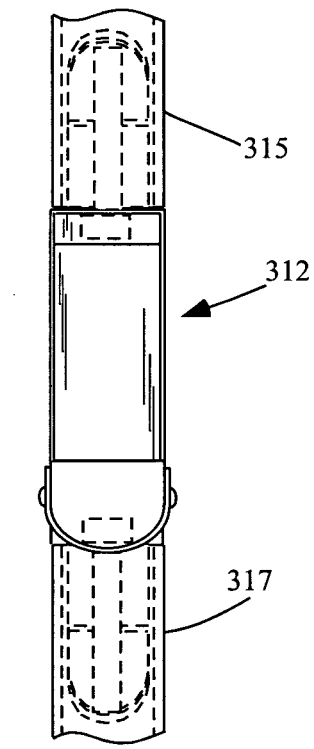
Fig. 3D

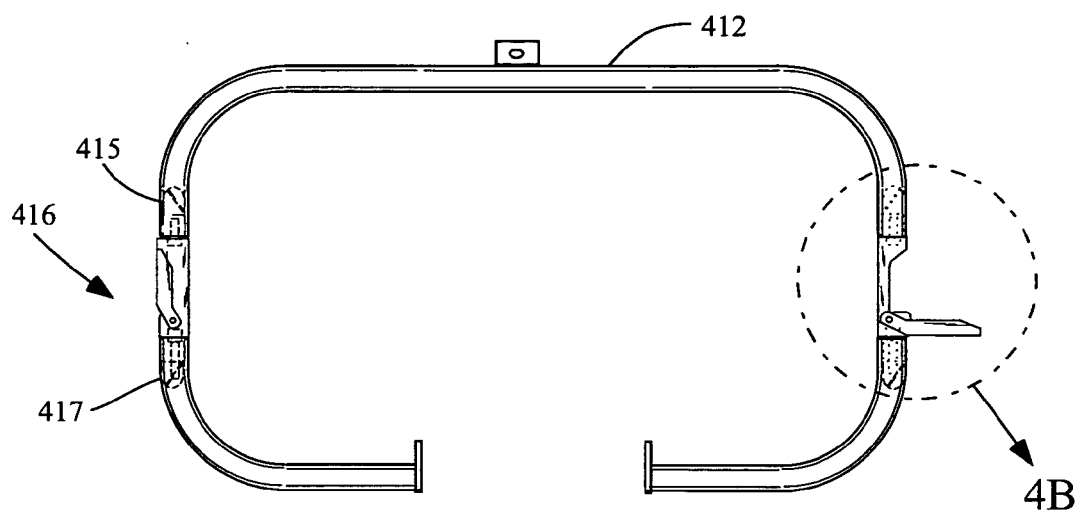
Fig. 4A
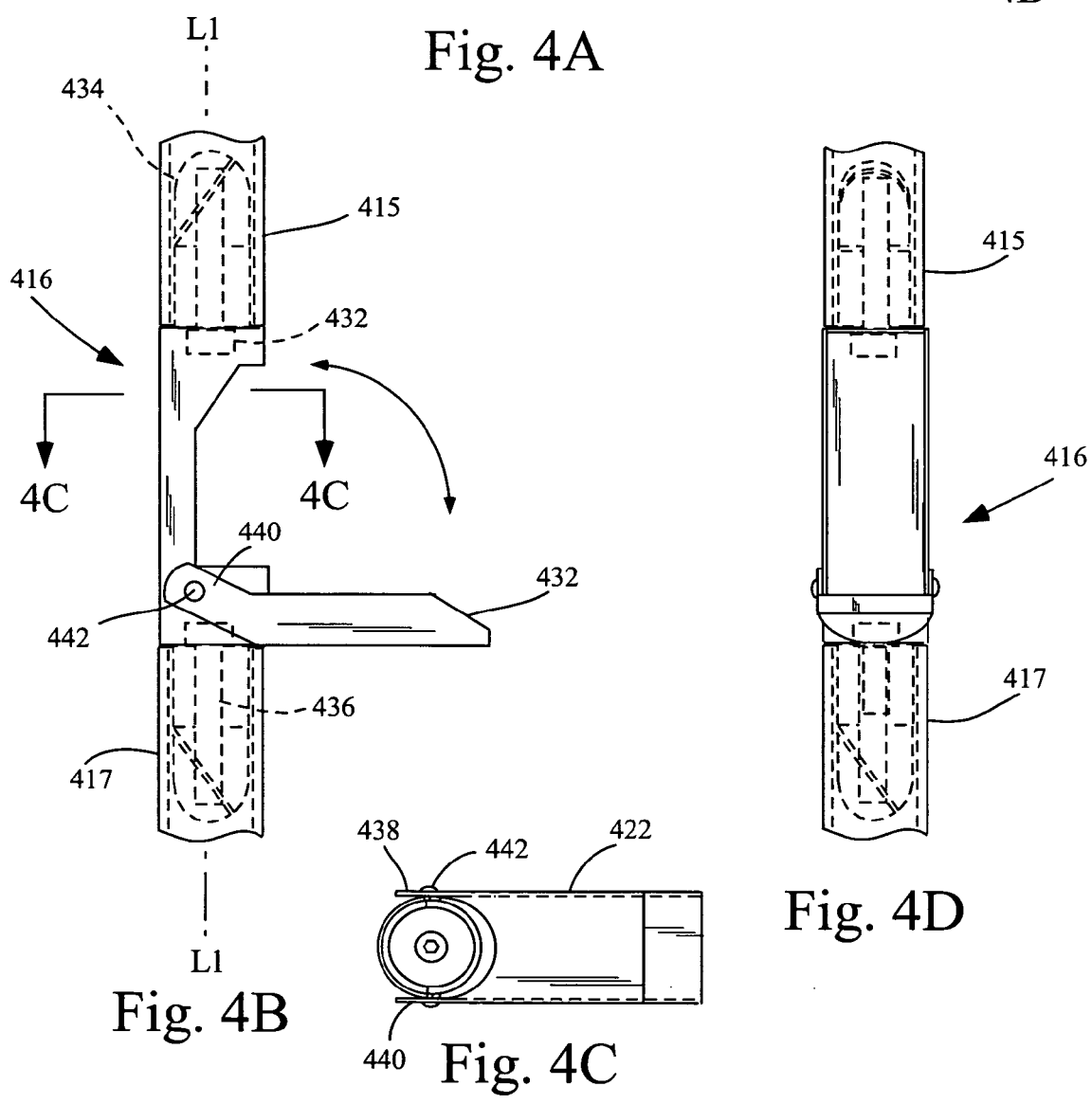
Fig. 4B
Fig. 4C
Fig. 4D

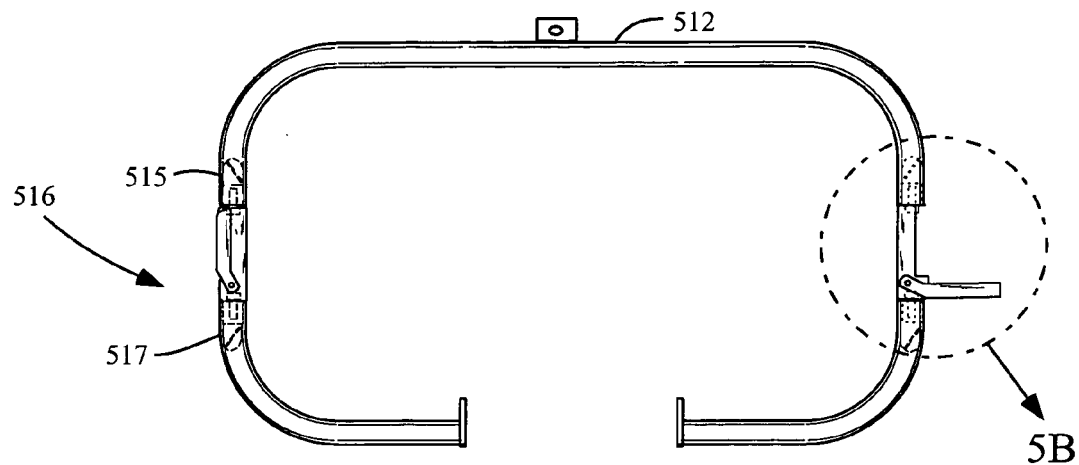
Fig. 5A
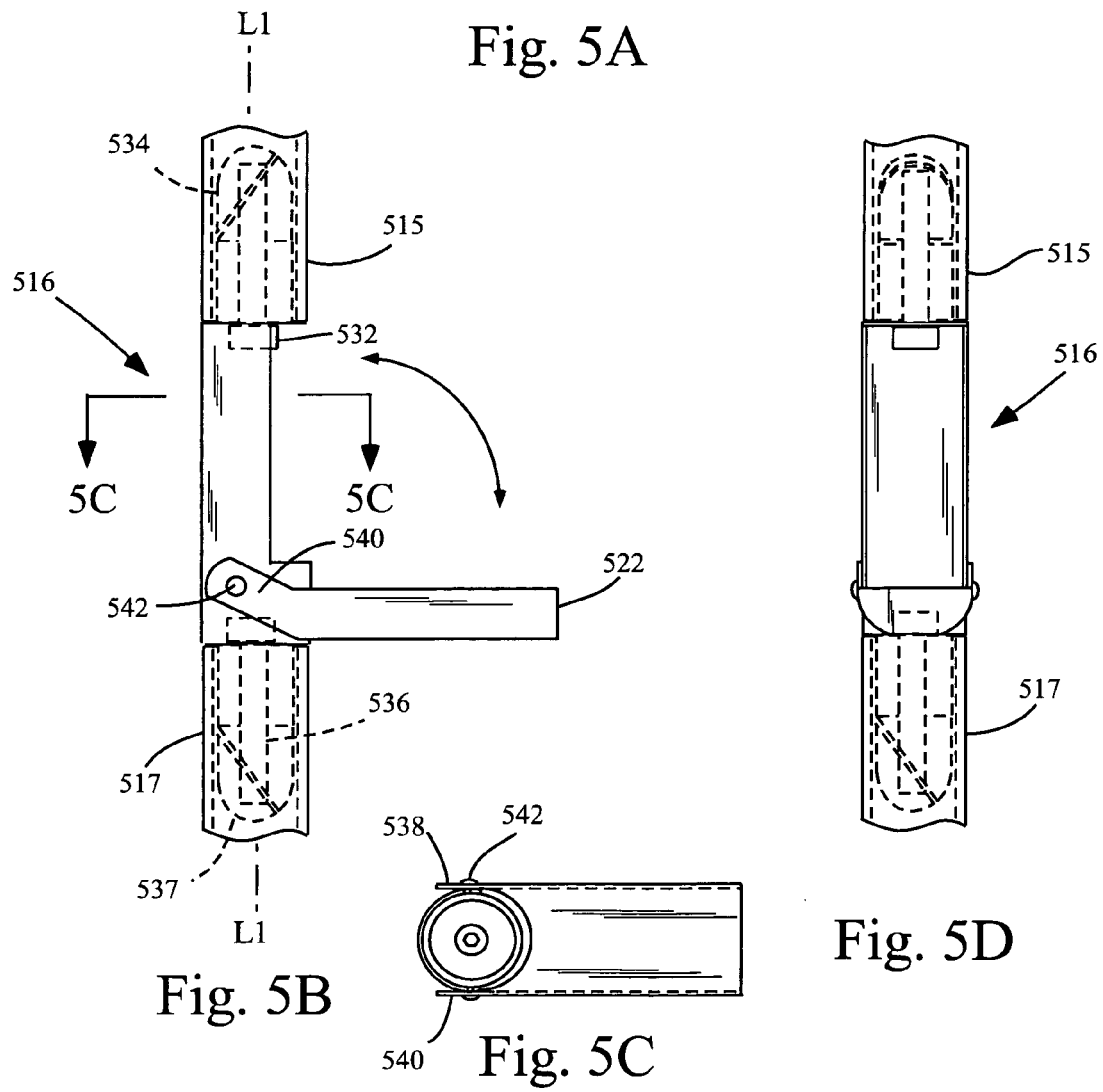
Fig. 5B
Fig. 5C
Fig. 5D

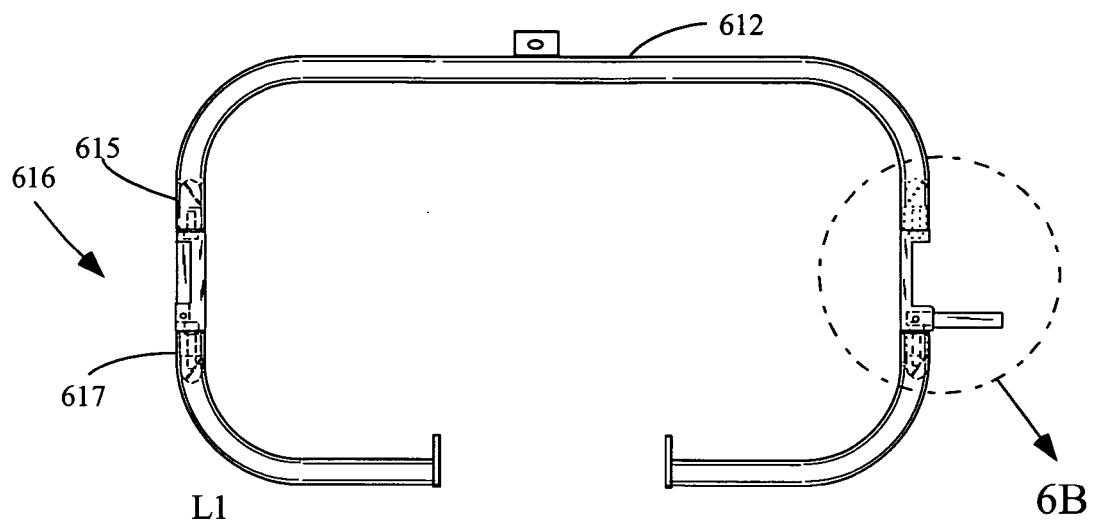
Fig. 6A
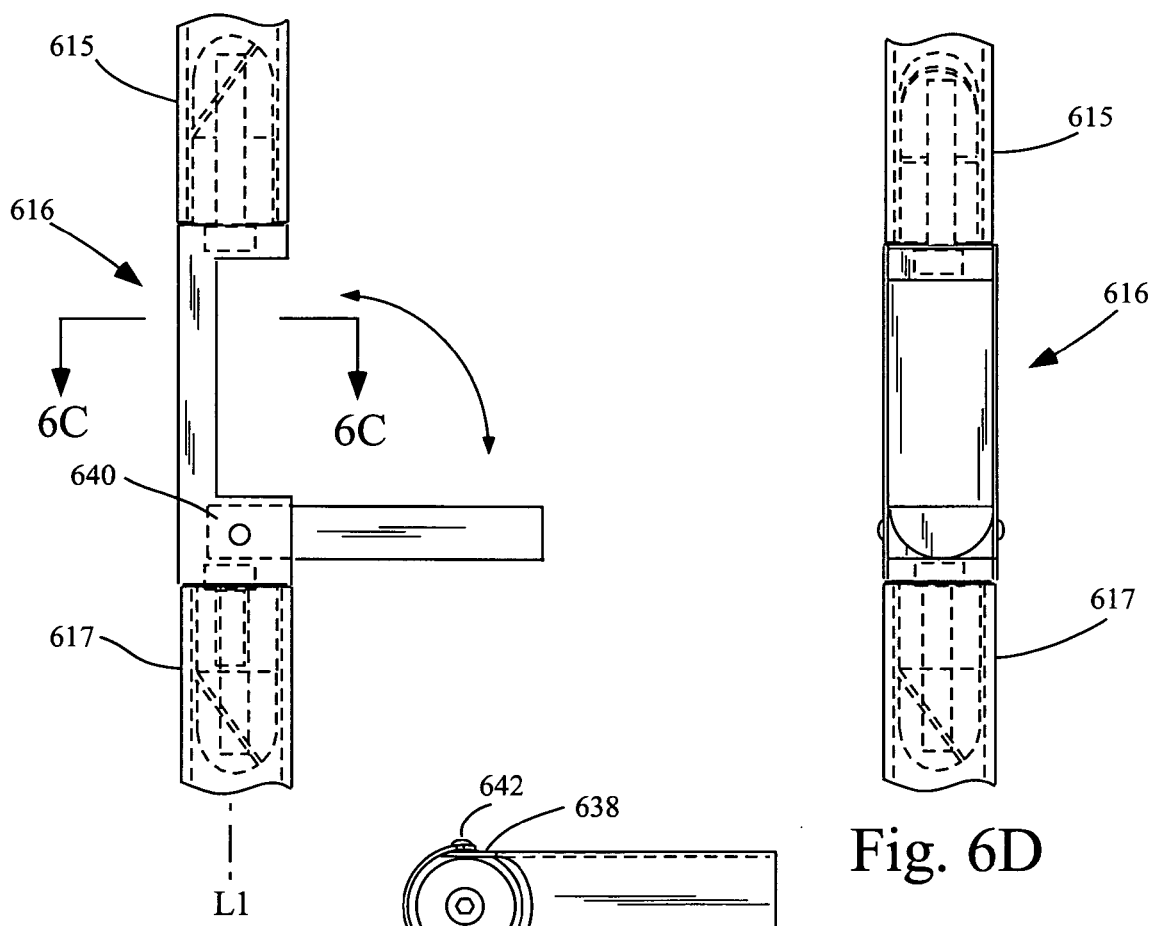
Fig. 6B
Fig. 6C
Fig. 6D

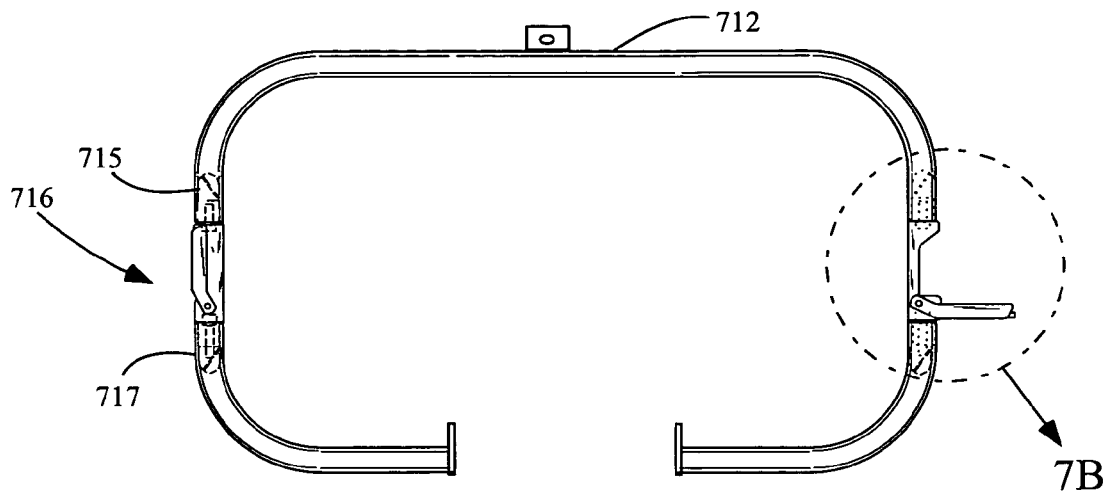
Fig. 7A
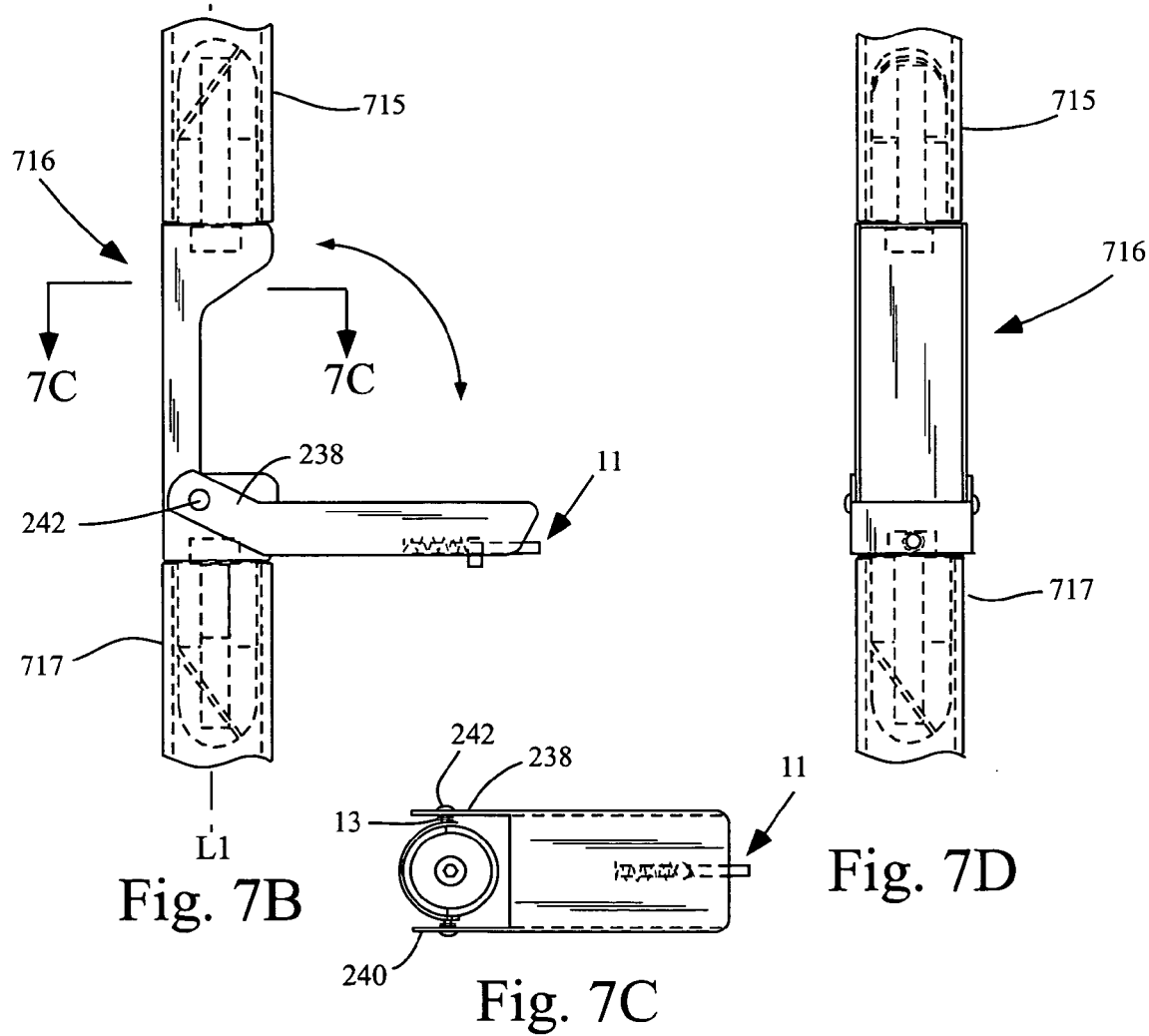
Fig. 7B
Fig. 7C
Fig. 7D

MOTORCYCLE FOOTREST

BACKGROUND OF THE INVENTION

The present invention generally relates to motorcycle accessories and more specifically to devices for a motorcycle rider to place and rest his or her feet while riding the motorcycle.

A variety of different footrests and foot-pegs are known for supporting the feet of a motorcycle rider. In particular, different devices are known for a rider to rest their feet during long extended riding, when it is not necessary for the rider to have their feet in immediate proximity to a foot brake pedal or a foot operated gear shifter. With this type of footrest, the rider is able to elevate their feet and assume more of a reclined position. One variety of this type of footrest mounts on a device referred to as an engine guard, also referred to as a "crash bar". An example of a crash bar appears in U.S. Pat. No. 6,419,039 (Wagner). The known footrests which attach to a crash bar typically employ an attachment clamp to secure the footrest to the crash bar. However, these footrests may detract from the streamlined look that many motorcycle owners desire to achieve for their bike. In addition, if the clamp becomes loose, it can either rotate or slide upon the crash bar, providing a less than secure footrest.

The apparatus disclosed herein addresses these problems. The disclosed footrests may be included as an integral part of a newly purchased crash bar. Alternatively, the disclosed footrests may be purchased separately, and an existing crash bar modified to accept the footrests.

SUMMARY OF THE INVENTION

The present invention is a footrest used in combination with a motorcycle crash bar. As known in the art, a crash bar extends on either side of the front of a motorcycle, on the outward side of the engine. The crash bar utilized in the present invention comprises a downwardly facing member and an opposite facing upwardly facing member on the respective sides of the motorcycle. The footrest of the present invention comprises a body member having a first end and a second end. The first end of the body member is adapted to be attached to the downwardly facing member of the crash bar. The second end of the body member is adapted to be attached to the upwardly facing member of the crash bar. A step member is pivotally attached to the body member with fastening means. The step member comprises a attached end and a free end.

BRIEF DESCRIPTION OF THE DRAWINGS

FIG. 2 and FIGS. 2a–2d, show a first embodiment of the footrest

FIG. 3 and FIGS. 3a–3d show a second embodiment of the footrest.

FIG. 4 and FIGS. 4a–4d show a third embodiment of the footrest.

FIG. 5 and FIGS. 5a–5d show a fourth embodiment of the footrest.

FIG. 6 and FIGS. 6a–6d show a fifth embodiment of the footrest.

FIGS. 7a–7d show how a latch mechanism may be used with an embodiment of the footrest.

DETAILED DESCRIPTION OF THE EMBODIMENTS

Figure 1:
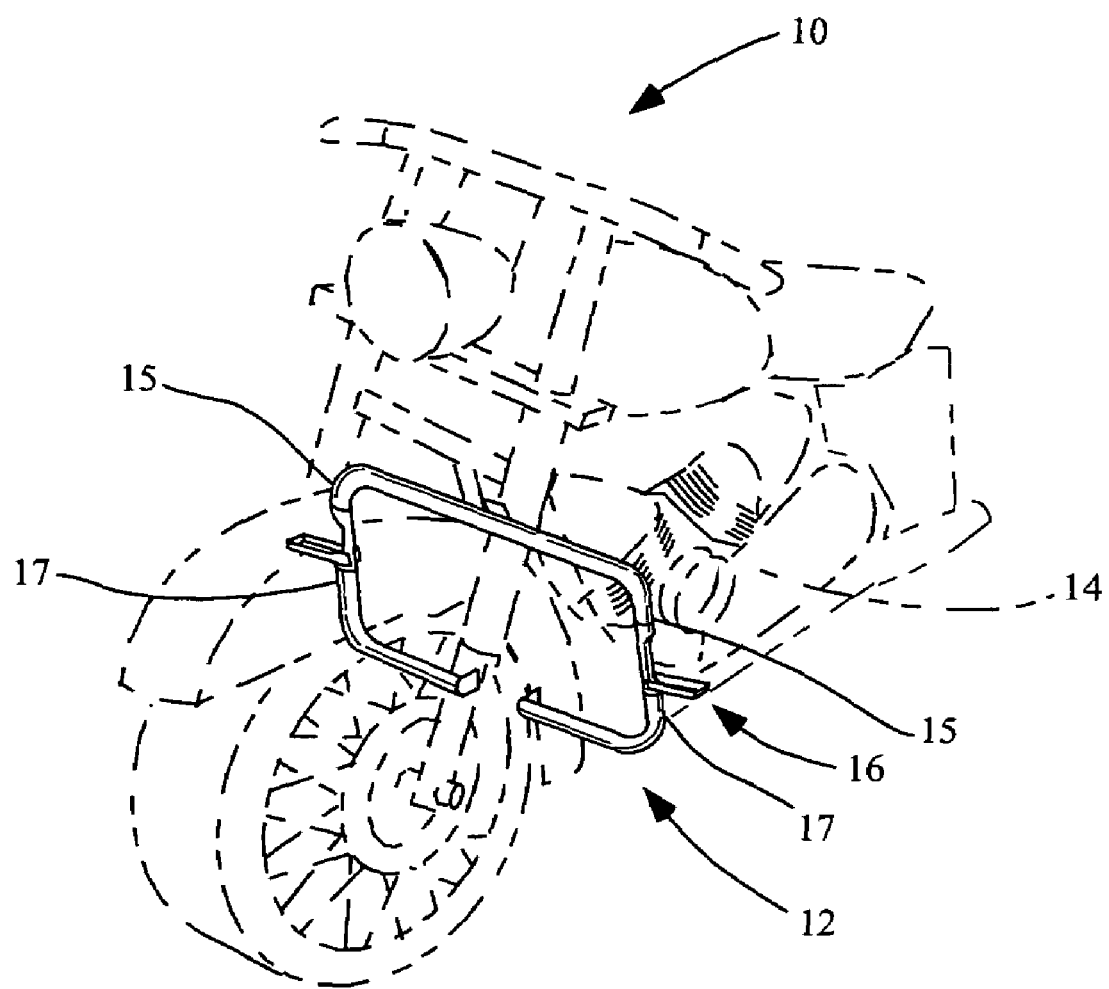
FIG. 1 schematically shows how the disclosed footrest generally attaches to a motorcycle.

Referring now specifically to the drawings, FIG. 1 shows schematically a motorcycle 10 with crash bar 12 installed in front of engine 14. As can be seen on FIG. 1, the crash bar 12 is located on the motorcycle 10 such that footrests 16 may be mounted on either side of the crash bar, allowing a rider to assume an alternate riding position, with the rider's feet resting on each of the footrests. The crash bar 12 may generally be manufactured from tubular materials, and plated or painted according to the desires of a rider. While the crash bar 12 may be fashioned in a number of different shapes, one known shape is the generally rectangular configuration shown in FIG. 1. The crash bar 12 may comprise a downwardly facing member 15 and an opposite facing upwardly facing member 17, which may be on opposite sides of the crash bar as depicted in FIG. 1. An embodiment of the footrest 16 may be disposed between the downwardly facing member 15 and the opposite upwardly facing member 17, as illustrated in FIG. 1. As generally shown in FIG. 1, and shown in greater detail in FIGS. 2a through 7a, footrest 16 may be pivoted or folded generally into alignment with an axis of the crash bar 12 such that the footrest appears to generally be an integral part of the crash bar, giving the crash bar a streamlined appearance. This feature also allows the footrest 16, when not in use, to be pivoted such that the footrest does not extend outwardly from the motorcycle, decreasing the likelihood of passerby bumping into the footrest and injuring himself.

As shown in FIGS. 2 through 7, there are a number of different embodiments of the footrest. However, in general terms the footrest comprises a body member having a first end and a second end. The first end is adapted to be attached to the downwardly facing member 15 of the crash bar 12 and the second end is adapted to be attached to the upwardly facing member 17. A step member is pivotally attached to the body member with fastening means, such that the step member has a attached end and a free end.

It is to be appreciated that a number of different modifications might be made to the footrest generally described above. For example, the location of the pivoting means may be outside of the body of the footrest as shown in FIGS. 2 through 5, or inside the body of the footrest as shown in FIG. 6. As another example, the step member has a locking mechanism 11 to positively retain the step member in either a generally vertical or generally horizontal orientation. An example of one type of locking mechanism 11 is shown in FIGS. 7a through 7d. FIG. 7c also shows the step member having a spring 13 which might be used to bias the step member in either a horizontal or vertical position. It is to be appreciated that each of the embodiments described below may be configured to utilize either interior or exterior pivoting, and, if desired, to utilize any type of locking mechanism.

It is also to be appreciated that the footrest 16 may be attached in a number of different ways to the crash bar 12. For example, the upper end of the footrest may be welded to the downwardly facing member 15 of the crash bar and the lower end of the footrest may be welded to the upwardly facing member 17. It is to be appreciated that the various embodiments of the invention may be installed in a crash bar and sold as an integrated unit for installation on a motorcycle. Alternatively, the footrest 16 may be acquired separately and installed into a crash bar previously acquired for the motorcycle.

As an alternative means of attaching the footrest 16 to a crash bar 12, the ends of the footrest may be adapted as either female or male ends which respectively receive or engage the opposite facing members of the crash bar. A variety of different attachment means might be used to attach the ends of the footrest to the adjacent facing members of the crash bar. For example, such attachment means may comprise a simple friction fit, matching splines, lockscrews, or a sliding wedge mechanism as illustrated in some of the figures. The user may desire that the particular attachment mechanism allows the footrest to be rotatable such that the step member might be rotated from a position generally perpendicular to the main axis of the motorcycle, to a position where the step member forms an angle with respect to the main axis of the motorcycle. This rotating feature would allow the user to adjust the angle of the step member according to the user's preference.

Figure 2:
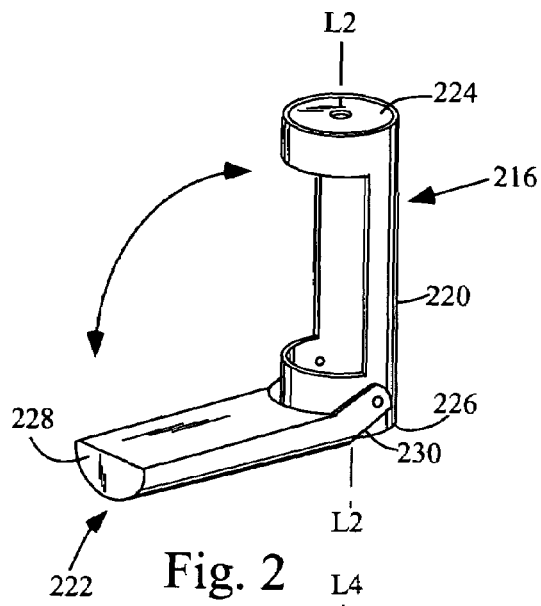

FIG. 2 shows one embodiment of the footrest 216 comprising a body member 220 and a step member 222 pivotally attached to the body member with fastening means, such as a retaining pin, bolt, or rivets and matching openings in step member 222 and body member 220. The body member 220 has a first end 224 and a second end 226. The step member 222 comprises a free end 228 and an attached end 230. As shown in FIG. 2, first end 224 may be closed with an opening for insertion of fastening means which may be used for attachment of the footrest 216 to a crash bar 212 as depicted in FIG. 2*a*. Likewise, although not shown in FIG. 2, second end 226 may also be closed with an opening for insertion of fastening means which may be used for attachment of the footrest 216 to the crash bar 212.

FIGS. 2*a* through 2*d* generally depict how this embodiment of the foot rest 216 is placed within a crash bar 212. As shown in FIG. 2*b*, step member 222 may comprise solid semi-circular stock. Footrest 216 may be disposed between downwardly facing member 215 of the crash bar and upwardly facing member 217. First end 224 may be inserted within downwardly facing member 215 and second end 226 may be inserted within the upwardly facing member 217. A friction connection between the respective ends of the body member 220 and the respective facing members of the crash bar 212 may be sufficient to retain foot rest 216 in the desired location, or the ends may directly abut one another. However, additional attachment means may also be used to secure footrest 216 to the crash bar 212.

For example, a first fastener 232 may be extend through first end 224, and extend into the downwardly facing member 215. First fastener 232 may engage a first wedge 234 disposed inside downwardly facing member 215. Likewise, a second fastener 236 may extend through second end 226 and extend into upwardly facing member 217 and engage a second wedge 237 disposed inside upwardly facing member. As first fastener 232 is tightened, wedge 234 is pulled into contact with the inside surface of the downwardly facing member 215, securing the footrest 216 to the downwardly facing member. Likewise, as second fastener 236 is tightened, second wedge 237 is pulled into contact with the inside surface of the upwardly facing member 217, securing the footrest 216 to the upwardly facing member. The orientation of the footrest 216 may be adjusted by loosening the first fastener 232 and the second fastener 236 and rotating the footrest with respect to the crash bar 212.

The downwardly facing member 215 and the upwardly facing member 217 of the crash bar may define a first longitudinal axis $L_1$. As shown in FIG. 2, the body member 220 may define a second longitudinal axis $L_2$. First longitudinal axis $L_1$ may be parallel with the second longitudinal axis $L_2$. The first longitudinal axis $L_1$ may also coincide with the second longitudinal axis $L_2$. Step member 222 may pivot over a range of positions, from a first position in which the step member is axially aligned with the second longitudinal axis $L_2$ to a second position in which the step member is normal to the second longitudinal axis. It is to be appreciated that the step member 222 may be attached to body member 220 with the attached end 230 of the step member having a first arm 238 and a second arm 240, with the body member disposed between the first arm and the second arm. In this arrangement, a pin In this arrangement, the step member 222 may be attached to the body member 220 with rivets 242 or other fastening means.

Figure 3:
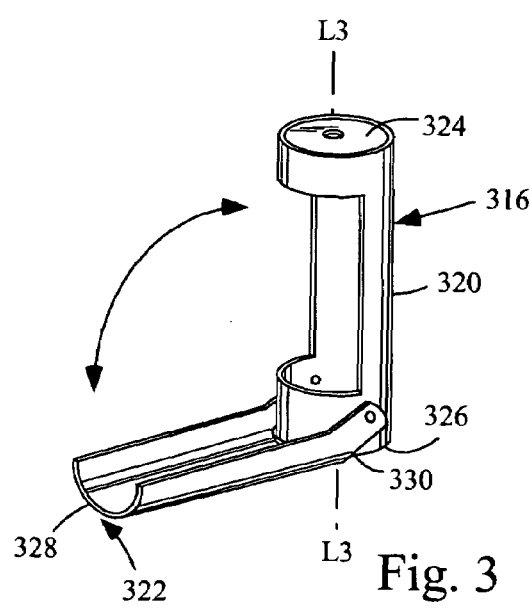

FIG. 3 shows another embodiment of the footrest 316 comprising a body member 320 and a step member 322 pivotally attached to the body member with fastening means, such as a pin, bolt or rivets and matching openings in step member 322 and body member 320. The body member 320 has a first end 324 and a second end 326. The step member 322 comprises a free end 328 and an attached end 330. As shown in FIG. 3, first end 324 may be closed with an opening for insertion of fastening means which may be used for attachment of the footrest 316 to a crash bar 312 as depicted in FIG. 3*a*. Likewise, although not shown in FIG. 3, second end 326 may also be closed with an opening for insertion of fastening means which may be used for attachment of the footrest 316 to the crash bar 312.

FIGS. 3*a* through 3*d* generally depict how this embodiment of the foot rest 316 is placed within a crash bar 312. As shown in FIG. 3*b*, step member 322 may comprise semi-circular tubing stock. Footrest 316 may be disposed between downwardly facing member 315 of the crash bar and upwardly facing member 317. First end 324 may be inserted within downwardly facing member 315 and second end 326 may be inserted within the upwardly facing member 317. A friction connection between the respective ends of the body member 320 and the respective facing members of the crash bar 312 may be sufficient to retain foot rest 316 in the desired location, or the ends may directly abut one another. However, additional attachment means may also be used to secure footrest 316 to the crash bar 312.

For example, a first fastener 332 may be extend through first end 324, and extend into the downwardly facing member 315. First fastener 332 may engage a first wedge 334 disposed inside downwardly facing member 315. Likewise, a second fastener 336 may extend through second end 326 and extend into upwardly facing member 317 and engage a second wedge 337 disposed inside upwardly facing member. As first fastener 332 is tightened, wedge 334 is pulled into contact with the inside surface of the downwardly facing member 315, securing the footrest 316 to the downwardly facing member. Likewise, as second fastener 336 is tightened, second wedge 337 is pulled into contact with the inside surface of the upwardly facing member 317, securing the footrest 316 to the upwardly facing member. The orientation of the footrest 316 may be adjusted by loosening the first fastener 332 and the second fastener 336 and rotating the footrest with respect to the crash bar 312.

The downwardly facing member 315 and the upwardly facing member 317 of the crash bar 312 may define a first longitudinal axis $L_1$. As shown in FIG. 3, the body member 320 may define a third longitudinal axis $L_3$ First longitudinal axis $L_1$ may be parallel with the third longitudinal axis $L_3$ The first longitudinal axis $L_1$ may also coincide with the third longitudinal axis $L_3$. Step member 322 may pivot over a range of positions, from a first position in which the step member is axially aligned with the third longitudinal axis $L_3$ to a second position in which the step member is normal to the third longitudinal axis. It is to be appreciated that the step member 322 may be attached to body member 320 with the attached end 330 of the step member having a first arm 338 and a second arm 340, with the body member disposed between the first arm and the second arm. In this arrangement, the step member 322 may be attached to the body member 320 with rivets 342.

Figure 4:
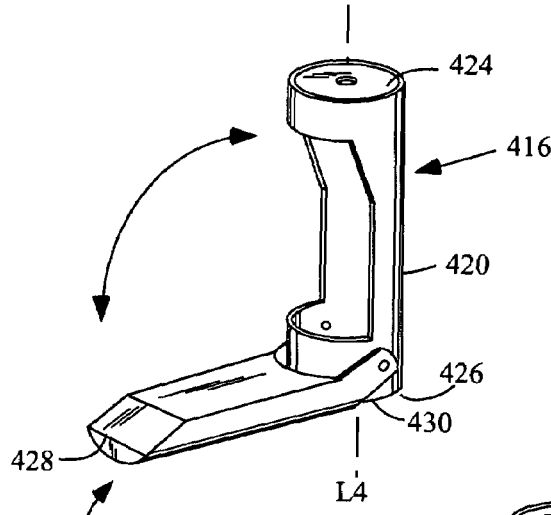

FIG. 4 shows another embodiment of the footrest 416 comprising a body member 420 and a step member 422 pivotally attached to the body member with fastening means, such as a pin, bolt or rivets and matching openings in step member 422 and body member 420. The body member 420 has a first end 424 and a second end 426. The step member 422 comprises a free end 428 and an attached end 430. As shown in FIG. 4, first end 424 may be closed with an opening for insertion of fastening means which may be used for attachment of the footrest 416 to a crash bar 412 as depicted in FIG. 4a. Likewise, although not shown in FIG. 4, second end 426 may also be closed with an opening for insertion of fastening means which may be used for attachment of the footrest 416 to the crash bar 412.

FIGS. 4a through 4d generally depict how this embodiment of the foot rest 416 is placed within a crash bar 412. As shown in FIG. 4b, step member 422 may comprise solid stock. Footrest 416 may be disposed between downwardly facing member 415 of the crash bar and upwardly facing member 417. First end 424 may be inserted within downwardly facing member 415 and second end 426 may be inserted within the upwardly facing member 417, or the ends may directly abut one another. A friction connection between the respective ends of the body member 420 and the respective facing members of the crash bar 412 may be sufficient to retain foot rest 416 in the desired location. However, additional attachment means may also be used to secure footrest 416 to the crash bar 412.

For example, a first fastener 432 may be extend through first end 424, and extend into the downwardly facing member 415. First fastener 432 may engage a first wedge 434 disposed inside downwardly facing member 415. Likewise, a second fastener 436 may extend through second end 426 and extend into upwardly facing member 417 and engage a second wedge 437 disposed inside upwardly facing member. As first fastener 432 is tightened, wedge 434 is pulled into contact with the inside surface of the downwardly facing member 415, securing the footrest 416 to the downwardly facing member. Likewise, as second fastener 436 is tightened, second wedge 437 is pulled into contact with the inside surface of the upwardly facing member 417, securing the footrest 416 to the upwardly facing member. The orientation of the footrest 416 may be adjusted by loosening the first fastener 432 and the second fastener 436 and rotating the footrest with respect to the crash bar 412.

The downwardly facing member 415 and the upwardly facing member 417 of the crash bar 412 may define a first longitudinal axis $L_1$. As shown in FIG. 4, the body member 420 may define a fourth longitudinal axis $L_4$ First longitudinal axis $L_1$ may be parallel with the fourth longitudinal axis $L_4$. The first longitudinal axis $L_1$ may also coincide with the fourth longitudinal axis $L_4$ Step member 422 may pivot over a range of positions, from a first position in which the step member is axially aligned with the fourth longitudinal axis $L_4$ to a second position in which the step member is normal to the fourth longitudinal axis. It is to be appreciated that the step member 422 may be attached to body member 420 with the attached end 430 of the step member having a first arm 438 and a second arm 440, with the body member disposed between the first arm and the second arm. In this arrangement, the step member 422 may be attached to the body member 420 with rivets 442.

Figure 5:
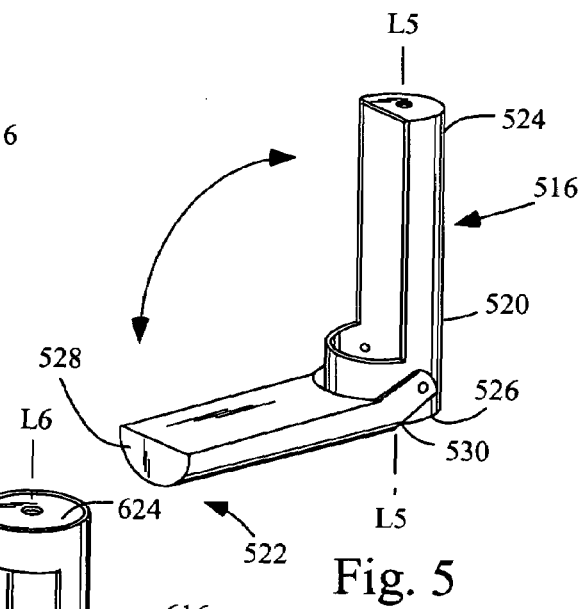
Figure 6:
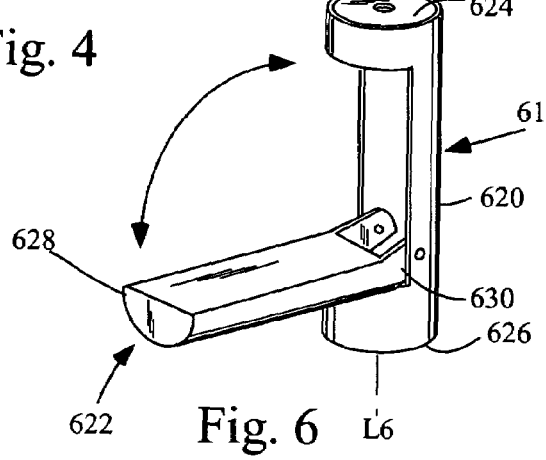

FIG. 5 shows another embodiment of the footrest 516 comprising a body member 520 and a step member 522 pivotally attached to the body member with fastening means, such as a pin, bolt or rivets and matching openings in step member 522 and body member 520. The body member 520 has a first end 524 and a second end 526. The step member 522 comprises a free end 528 and an attached end 530. As shown in FIG. 5, first end 524 may be closed with an opening for insertion of fastening means which may be used for attachment of the footrest 516 to a crash bar 512 as depicted in FIG. 5a. Likewise, although not shown in FIG. 5, second end 526 may also be closed with an opening for insertion of fastening means which may be used for attachment of the footrest 516 to the crash bar 512.

FIGS. 5a through 5d generally depict how this embodiment of the foot rest 516 is placed within a crash bar 512. As shown in FIG. 5b, step member 522 may comprise solid stock. Footrest 516 may be disposed between downwardly facing member 515 of the crash bar and upwardly facing member 517. First end 524 may be inserted within downwardly facing member 515 and second end 526 may be inserted within the upwardly facing member 517. A friction connection between the respective ends of the body member 520 and the respective facing members of the crash bar 512 may be sufficient to retain foot rest 516 in the desired location, or the ends may directly abut one another.

However, additional attachment means may also be used to secure footrest 516 to the crash bar 512. For example, a first fastener 532 may be extend through first end 524, and extend into the downwardly facing member 515. First fastener 532 may engage a first wedge 534 disposed inside downwardly facing member 515. Likewise, a second fastener 536 may extend through second end 526 and extend into upwardly facing member 517 and engage a second wedge 537 disposed inside upwardly facing member. As first fastener 532 is tightened, wedge 534 is pulled into contact with the inside surface of the downwardly facing member 515, securing the footrest 516 to the downwardly facing member. Likewise, as second fastener 536 is tightened, second wedge 537 is pulled into contact with the inside surface of the upwardly facing member 517, securing the footrest 516 to the upwardly facing member. The orientation of the footrest 516 may be adjusted by loosening the first fastener 532 and the second fastener 536 and rotating the footrest with respect to the crash bar 512.

The downwardly facing member 515 and the upwardly facing member 517 of the crash bar 512 may define a first longitudinal axis $L_1$. As shown in FIG. 5, the body member 520 may define a fifth longitudinal axis $L_5$ First longitudinal axis $L_1$ may be parallel with the fifth longitudinal axis $L_5$. The first longitudinal axis $L_1$ may also coincide with the fifth longitudinal axis $L_5$. Step member 522 may pivot over a range of positions, from a first position in which the step member is axially aligned with the fifth longitudinal axis $L_5$ to a second position in which the step member is normal to the fifth longitudinal axis. It is to be appreciated that the step member 522 may be attached to body member 520 with the attached end 530 of the step member having a first arm 538 and a second arm 540, with the body member disposed between the first arm and the second arm. In this arrangement, the step member 522 may be attached to the body member 520 with rivets 542.

FIG. 6 shows another embodiment of the footrest 616 comprising a body member 620 and a step member 622 pivotally attached to the body member with fastening means, such as a pin, bolt or rivets and matching openings in step member 622 and body member 620. The body member 620 has a first end 624 and a second end 626. The step member 622 comprises a free end 628 and an attached end 630. As shown in FIG. 6, first end 624 may be closed with an opening for insertion of fastening means which may be used for attachment of the footrest 616 to a crash bar 612 as depicted in FIG. 6*a*. Likewise, although not shown in FIG. 6, second end 626 may also be closed with an opening for insertion of fastening means which may be used for attachment of the footrest 616 to the crash bar 612.

FIGS. 6*a* through 6*d* generally depict how this embodiment of the foot rest 616 is placed within a crash bar 612. As shown in FIG. 6*b*, step member 622 may comprise semi-circular solid stock. Footrest 616 may be disposed between downwardly facing member 615 of the crash bar and upwardly facing member 617. First end 624 may be inserted within downwardly facing member 615 and second end 626 may be inserted within the upwardly facing member 617. A friction connection between the respective ends of the body member 620 and the respective facing members of the crash bar 612 may be sufficient to retain foot rest 616 in the desired location, or the ends may directly abut one another. However, additional attachment means may also be used to secure footrest 616 to the crash bar 612.

For example, a first fastener 632 may be extend through first end 624, and extend into the downwardly facing member 615. First fastener 632 may engage a first wedge 634 disposed inside downwardly facing member 615. Likewise, a second fastener 636 may extend through second end 626 and extend into upwardly facing member 617 and engage a second wedge 637 disposed inside upwardly facing member. As first fastener 632 is tightened, wedge 634 is pulled into contact with the inside surface of the downwardly facing member 615, securing the footrest 616 to the downwardly facing member. Likewise, as second fastener 636 is tightened, second wedge 637 is pulled into contact with the inside surface of the upwardly facing member 617, securing the footrest 616 to the upwardly facing member. The orientation of the footrest 616 may be adjusted by loosening the first fastener 632 and the second fastener 636 and rotating the footrest with respect to the crash bar 612.

The downwardly facing member 615 and the upwardly facing member 617 of the crash bar 612 may define a first longitudinal axis $L_1$. As shown in FIG. 6, the body member 620 may define a sixth longitudinal axis $L_6$. First longitudinal axis $L_1$ may be parallel with the sixth longitudinal axis $L_6$. The first longitudinal axis $L_1$ may also coincide with the sixth longitudinal axis $L_6$. Step member 622 may pivot over a range of positions, from a first position in which the step member is axially aligned with the sixth longitudinal axis $L_6$ to a second position in which the step member is normal to the sixth longitudinal axis. It is to be appreciated that the step member 622 may be attached to body member 620 with the attached end 630 of the step member having a first arm 638 and a second arm 640, with first arm 638 and second arm 640 disposed inside an opening in the body member. In this arrangement, the step member 622 may be attached to the body member 620 with rivets 642.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A footrest used in combination with a motorcycle crash bar, the crash bar comprising a downwardly facing member and an opposite facing upwardly facing member, wherein the downwardly facing member of the crash bar and the upwardly facing member of the crash bar define a first longitudinal axis, the footrest comprising:
    a body member comprising a first end and a second end, wherein the first end is adapted to be attached to the downwardly facing member of the crash bar and the second end is adapted to be attached to the upwardly facing member of the crash bar; and
    a step member pivotally attached to the body member with pivoting means, wherein the step member comprises a free end and an attached end.

2. The footrest of claim 1 wherein the body member of the foot rest defines a second longitudinal axis.

3. The footrest of claim 2 wherein the first longitudinal axis coincides with the second longitudinal axis.

4. The footrest of claim 2 wherein the step member pivots over a range of positions, from a first position in which the step member is axially aligned with the second longitudinal axis to a second position in which the step member is normal to the second longitudinal axis.

5. The footrest of claim 1 wherein the first end comprises a first fastener inserted within the downwardly facing member.

6. The footrest of claim 1 wherein the second end comprises a second fastener inserted within the upwardly facing member.

7. The footrest of claim 5 wherein a first fastener extends into a first wedge, wherein the first wedge is disposed within the downwardly facing member.

8. The footrest of claim 6 wherein the second fastener engages a second wedge, wherein the second wedge is disposed inside the upwardly facing member.

9. The footrest of claim 1 wherein the attached end comprises a first arm and a spaced-apart and opposite facing second arm.

10. The footrest of claim 9 wherein the body member is disposed between the first arm and the second arm.

11. The footrest of claim 9 wherein the body member comprises an opening and the first arm and second arm are pivotally attached within the opening.

12. A footrest used in combination with a motorcycle crash bar, the crash bar comprising a downwardly facing member and an opposite facing upwardly facing member, the footrest comprising:
    a body member comprising a first end and a second end, wherein the first end is adapted to be attached to the downwardly facing member of the crash bar and the second end is adapted to be attached to the upwardly facing member of the crash bar; and
    a step member pivotally attached to the body member with pivoting means, wherein the step member comprises a free end, an attached end, and a locking mechanism for locking the step member into a generally parallel alignment with the body member.

13. The footrest of claim 12 wherein the first end comprises a first fastener inserted within the downwardly facing member.

14. The footrest of claim 12 wherein the second end comprises a second fastener inserted within the upwardly facing member.

15. The footrest of claim 13 wherein a first fastener extends into a first wedge, wherein the first wedge is disposed within the downwardly facing member.

16. The footrest of claim 13 wherein the second fastener engages a second wedge, wherein the second wedge is disposed inside the upwardly facing member.

17. A footrest used in combination with a motorcycle crash bar, the crash bar comprising a downwardly facing member and an opposite facing upwardly facing member, the downwardly facing member of the crash bar and the upwardly facing member of the crash bar defining a first longitudinal axis, the footrest comprising:

a body member comprising a first end and a second end, wherein the first end and the second end define a second longitudinal axis, wherein the first end is adapted to be attached to the downwardly facing member of the crash bar and the second end is adapted to be attached to the upwardly facing member of the crash bar; and a step member pivotally attached to the body member with pivoting means, wherein the step member comprises a free end, and an attached end, wherein the step member pivots over a range of positions, from a first position in which the step member is axially aligned with the second longitudinal axis to a second position in which the step member is normal to the second longitudinal axis.

18. The footrest of claim 17 wherein the step member further comprises a spring which biases the step member in the first position.

19. The footrest of claim 17 wherein the step member further comprises a spring which biases the step member in the second position.

* * * * *